(12) United States Patent
Kashiwaba et al.

(10) Patent No.: US 7,675,567 B2
(45) Date of Patent: Mar. 9, 2010

(54) CAMERA, CAMERA SYSTEM, AND LENS APPARATUS

(75) Inventors: Seiichi Kashiwaba, Utsunomiya (JP); Tohru Kawai, Kawasaki (JP); Masanori Ishikawa, Saitama (JP); Mitsuru Shinohara, Hokuto (JP); Shigeki Sato, Utsunomiya (JP); Yuki Nagao, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 977 days.

(21) Appl. No.: 11/144,928

(22) Filed: Jun. 3, 2005

(65) Prior Publication Data

US 2005/0275739 A1    Dec. 15, 2005

(30) Foreign Application Priority Data

Jun. 11, 2004 (JP) ............................. 2004-174032

(51) Int. Cl.
*H04N 5/225* (2006.01)
*H04N 5/222* (2006.01)

(52) U.S. Cl. .................... 348/360; 348/333.02

(58) Field of Classification Search .............. 348/344, 348/360, 208.15, 333.02, 333.04, 361
See application file for complete search history.

(56) References Cited

U.S. PATENT DOCUMENTS

| 6,130,994 | A  | * | 10/2000 | Maruyama | ............... | 396/60 |
| 7,151,570 | B2 | * | 12/2006 | Kaneda | ................. | 348/360 |
| 7,423,682 | B2 | * | 9/2008 | Kawashima | .......... | 348/333.01 |
| 2002/0101531 | A1 | * | 8/2002 | Kaneda | ................. | 348/347 |

FOREIGN PATENT DOCUMENTS

JP    3-76384 A    4/1991
JP    4-91480 U    8/1992

* cited by examiner

*Primary Examiner*—David L Ometz
*Assistant Examiner*—Dillon Durnford-Geszvain
(74) *Attorney, Agent, or Firm*—Canon U.S.A., Inc. I.P. Division

(57) ABSTRACT

A camera is provided which includes an image capturing element; a memory for recording images obtained from the image capturing element; and a controller for changing the number of recorded pixels of the images stored in the memory based on information about a lens apparatus that can be operatively connected to the camera.

6 Claims, 3 Drawing Sheets

CAMERA, CAMERA SYSTEM, AND LENS APPARATUS

BACKGROUND OF THE INVENTION

1. Field of the Invention

The present invention relates generally to a camera, camera system and lens apparatus and more particularly, although not exclusively, cameras having an image capturing element and a memory.

2. Description of the Related Art

In a lens-interchangeable camera system, there have been mounting-mechanism types independently different for every image size cameras and lens apparatuses, and these types of lens apparatus are less versatile.

Beam shading (vignetting) arises in the combination of a lens apparatus having a small image size and a camera having a large image size. A conventional method of avoiding beam shading is to construct a lens apparatus, having a small image size, in a way so it can not be mounted on a camera, having a large image size.

Another camera system proposed (see Japanese Patent Publication No. 2521816, for example), where a lens apparatus is electrically connected to a camera, inhibits the shooting of the camera when the image size of the camera is determined not to coincide with that of the lens apparatus based on the information about the image size of the lens apparatus stored in the lens (when the image size of the lens apparatus is smaller). Another conventional camera system (see Japanese Utility Model Laid-Open No. 04-91480, for example) only enlarges and records an image, with an electronic circuit, in the image range where the shading is not generated.

SUMMARY OF THE INVENTION

At least one exemplary embodiment provides a camera, a camera system, and a lens apparatus capable of storing captured images without shading even when the lens apparatus having an image size being not adapted to the camera is mounted thereon.

In at least one exemplary embodiment, a camera system is provided that can include a plurality of lens apparatuses with different image sizes and a camera capable of selectively mounting the plurality of lens apparatuses thereon according to at least one exemplary embodiment and includes: an image capturing element; a memory for recording images obtained from the image capturing element; and a controller configured to change the number of recorded pixels of the images stored in the memory based on information about the image size of the lens apparatus acquired from the lens apparatus mounted on the camera. The controller herein may determine whether the number of currently recorded pixels set at the present corresponds to the current lens apparatus mounted on the camera based on the information about the image size, and if it does not correspond, the controller can change the number of recorded pixels to correspond to the number of recorded pixels related to the current lens apparatus.

In at least one exemplary embodiment, a camera system is provided that can include a plurality of lens apparatuses with different image sizes and the camera capable of selectively mounting the plurality of lens apparatuses thereon according to at least one exemplary embodiment and includes: an image capturing element; a memory for recording images obtained from the image capturing element; a display; and a controller configured to detect the number of recorded pixels to be recorded in the memory and being selectable for the mounted lens apparatus based on information about the image size of the lens apparatus acquired from the lens apparatus mounted on the camera, and if the number of recorded pixels different from the number of selectable pixels, the controller can facilitate the display of a message that the number of recorded pixels can be changed.

In at least one exemplary embodiment, a camera system is provided that can include a plurality of lens apparatuses with different image sizes and the camera capable of selectively mounting the plurality of lens apparatuses thereon according to a at least one exemplary embodiment and includes: an image capturing element; a memory for recording images obtained from the image capturing element; a display; and a controller configured to detect the number of recorded pixels to be recorded in the memory and being selectable for the mounted lens apparatus based on information about the image size of the lens apparatus acquired from the lens apparatus mounted on the camera so as to facilitate the display to display the selectable number of recorded pixels.

In at least one exemplary embodiment, a camera system is provided that can include a plurality of lens apparatuses with different image sizes and the camera capable of selectively mounting the plurality of lens apparatuses thereon according to at least one exemplary embodiment and includes: an image capturing element; a memory for recording images obtained from the image capturing element; a display; and a controller configured to detect the number of recorded pixels to be recorded in the memory and being incompatible t for the mounted lens apparatus based on information about the image size of the lens apparatus acquired from the lens apparatus mounted on the camera so as to limit the selection of the number of recorded pixels to numbers compatible with the lens apparatus.

In at least one exemplary embodiment, a camera system is provided that can include a plurality of lens apparatuses with different image sizes and the camera capable of selectively mounting the plurality of lens apparatuses thereon according to at least one exemplary embodiment and includes: an image capturing element; a memory for recording images obtained from the image capturing element; a display; and a controller configured to detect the selectable number of recorded pixels to be recorded in the memory based on information about the image size of the lens apparatus acquired from the lens apparatus mounted on the camera so as to make the display range by the display correspond to the selectable number of recorded pixels.

In at least one exemplary embodiment, a lens apparatus is provided that can include a plurality of the lens apparatuses with different image sizes and a camera capable of selectively mounting the plurality of the lens apparatuses thereon according to at least one exemplary embodiment and includes: an image capturing element; a memory for recording images obtained from the image capturing element; and a controller configured to transmit information about the image size recorded in the memory to the camera.

In at least one exemplary embodiment, a camera system is provided that includes: at least one camera, where the camera has a number of camera pixels associated with a camera image size of an image capturing element; a lens apparatus, where the lens apparatus has a lens apparatus image; and a camera processor, where the camera processor sets a usable number of camera pixels, where the usable number of camera pixels is equal to or less than the number of camera pixels that correspond to at least one characteristic of the lens apparatus image.

In yet at least one further exemplary embodiment, the camera can be operatively connected to the lens apparatus, where the lens apparatus includes at least two lens elements. Further in at least one exemplary embodiment the lens apparatus can include a lens apparatus processor that transmits at least one lens apparatus image characteristic to the camera processor, where the lens apparatus image characteristic can be at least one of a vertical image size, a horizontal image size, a diagonal image size, and radius information of an image circle.

Further features of exemplary embodiments will become apparent from the following description of exemplary embodiments with reference to the attached drawings.

DESCRIPTION OF THE EMBODIMENTS

The following description of at least one exemplary embodiment is merely illustrative in nature and is in no way intended to limit the invention, its application, or uses.

Processes, techniques, apparatus, and materials as known by one of ordinary skill in the art may not be discussed in detail but are intended to be part of the enabling description where appropriate. For example camera systems are discussed and any material that can be used to form elements of camera systems should fall within the scope of exemplary embodiments (e.g. glass, Si). Additionally the actual size of the elements of camera systems or other elements of exemplary embodiments may not be discussed, however any size from macro to micro and nano are intended to lie within the scope of exemplary embodiments (e.g. lenses with diameters of nanometer size, micro size, centimeter, and meter sizes). Additionally exemplary embodiments are not limited to visual camera systems, for example the system can be designed for use with infrared and other wavelength systems.

Several exemplary embodiments will be described below with reference to the accompanying drawings.

Figure 1:
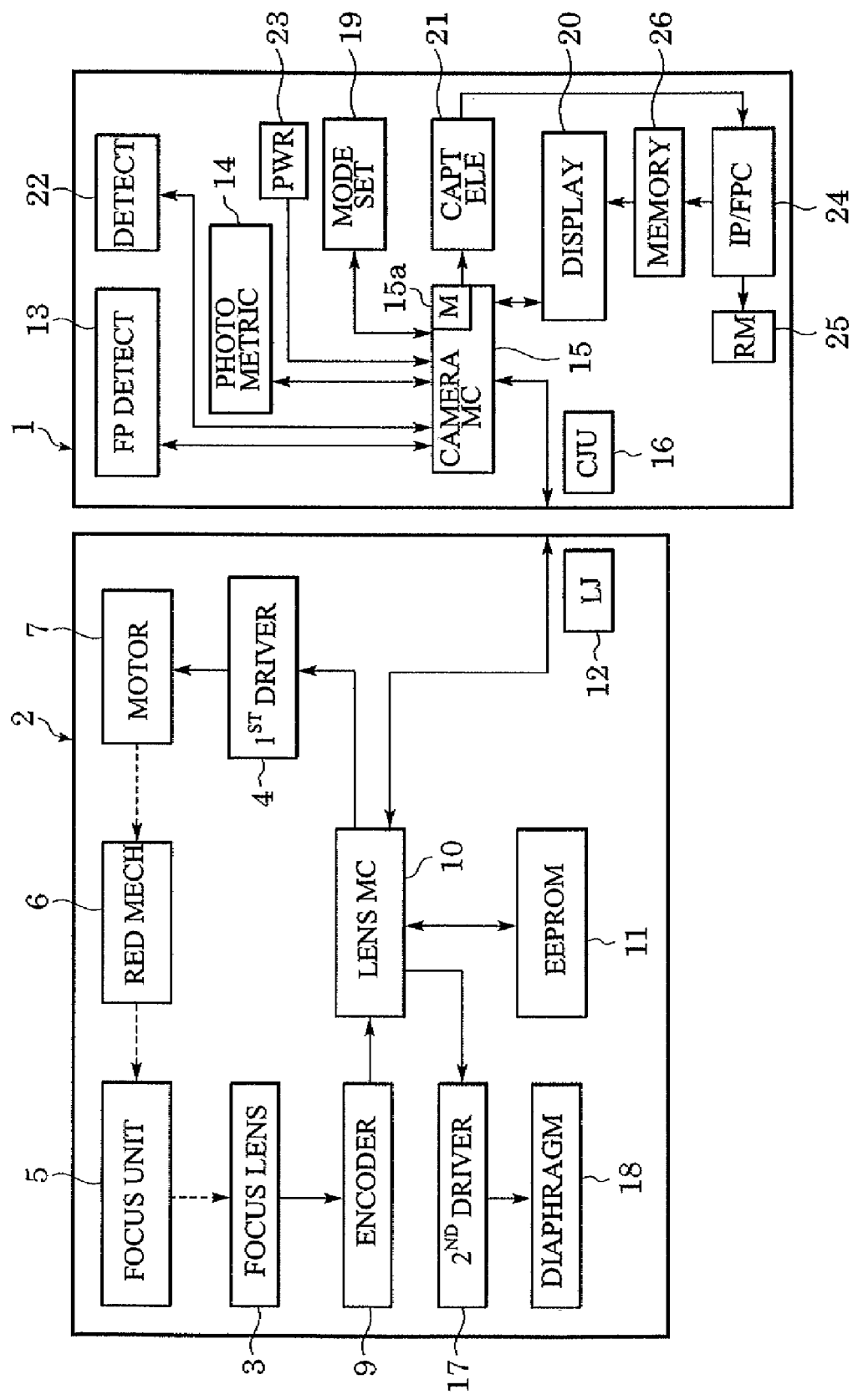
FIG. 1 illustrates a functional block diagram of a camera system according to at least one exemplary embodiment.

FIG. 1 illustrates a functional block diagram of a camera system according to at least one exemplary embodiment. Referring to the drawing, reference numeral 1 denotes a camera (image capturing apparatus) and numeral 2 denotes a lens apparatus (image capturing lens) detachable to the camera 1.

First, the structure of the lens apparatus 2 will be described. A motor 7 is configured to move a focus lens 3. The motor 7 can be any type of motor capable of satisfying design size and power requirements (e.g., a stepping motor having a rotor, a magnet, and a yoke, and a vibration motor having a vibrator vibrated by an electro-mechanical energy conversion element and a body of rotation driven by the vibrator, equivalents and any other type of motor as known by one of ordinary relevant skill in the arts)

A focus unit 5 has a mechanism for moving the focus lens 3 along an optical axis for focusing. A reduction mechanism 6 can be used for reducing the output of the motor 7 and increasing the torque thereof when the motor 7 drives the focus unit 5. A diaphragm 18 can be used to control the amount of light passing-through the lens apparatus 2 by affecting the light path so as to change the opening area for an image-capturing beam.

A lens microcomputer 10 can be used to control the entire of the lens apparatus 2 or portions thereof. An EEPROM (electrically erasable programmable read-only memory) 11 can be used as an electrically rewritable memory element for storing various histories and data related to the lens apparatus 2 by communicating with the lens microcomputer 10. In at least one further exemplary embodiment, various other memory systems can be used instead of EEPROM 11 (e.g., flash memory, DRAM, SDRAM, minidisk, equivalents, and other memory storage systems as known by one of ordinary relevant skill in the arts). A first driver circuit 4 can be used for applying driving electric power to the motor 7 from the lens microcomputer 10. In the EEPROM 11 herein, information about the characteristics of the lens apparatus 2 (e.g., image size) can be stored. For example, image size of the lens apparatus can be stored which can include vertical and horizontal image sizes, a diagonal image size, and radius information of an image circle as well as identification information of the lens apparatus 2 itself.

An encoder unit 9 can be used for detecting the drive amount of the focus lens 3 driven by the motor 7 via the reduction mechanism 6 and the focus unit 5. A second driver circuit 17 can be used for applying driving electric power to the diaphragm 18 from the lens microcomputer 10. Additionally, a lens junction unit 12 can be used (e.g., via a contact point) for the lens microcomputer 10 to communicate with the camera 1.

Next, the structure of the camera 1 will be described. A camera microcomputer 15 can control the entire of the camera 1 or portions thereof. The camera microcomputer can query and/or command a focal point detecting unit 13, which can be used for detecting the displacement from an in-focus position of the focus lens 3. A photometric unit 14 can be used for detecting the luminance of an object and can be queried or commanded by the camera microcomputer 15.

A mode setting unit 19 can change various settings in the camera system by the operation of a user. A display unit 20 is for displaying various kinds of information of a shooting object and the mode setting. Light passing through the image capturing optical system of the lens apparatus 2 forms an image on an image capturing element (e.g., CCD sensor or CMOS sensor, for example) 21, which has a total number of pixels (i.e., camera pixels). A camera junction unit 16 can have a contact point for the camera microcomputer 15 to communicate with the lens apparatus 2. When the lens apparatus 2 is mounted on the camera 1, the lens junction unit 12 comes in contact with the camera junction unit 16 electrically.

The camera microcomputer 15 herein can include a memory 15a inside. In the memory 15a, information about the number of imaging pixels existing in an imageable area of the image capturing element 21 (i.e., the number of camera pixels associated with an image from the lens apparatus), corresponding to the above-mentioned image size of the lens apparatus 2, can be stored as a memory table. The camera microcomputer 15 (e.g., micro-processor) can obtain the information about the number of imaging pixels corresponding to the information about the image size based on the information about the image size from the lens apparatus 2.

A lens detection circuit 22 can be used for detecting the insertion and withdrawal of the lens apparatus 2. A power supply switch 23 can be used for starting the camera system. An image processing/file producing circuit 24 produces a file of the number of established pixels based on a signal produced by the image capturing element 21 so as to record it in an internal memory 26 of the camera 1 and/or in a recording medium (semiconductor memory, optical disc, magnetic disc, equivalents and other known memory devices as known by one of ordinary relevant skill in the art).

The number of established pixels herein shows the size of the image information in recording, i.e., the amount of the image information. The number of established pixels, as will be described later, is selected from a plurality of non-restrictive number of pixels (3072×2048, 2048×1360, 1536×1024, and 1024×768, for example).

In addition, in FIG. 1, the dotted line indicates a mechanical contact or connection and the solid line indicates the electrical connection.

Figure 2:
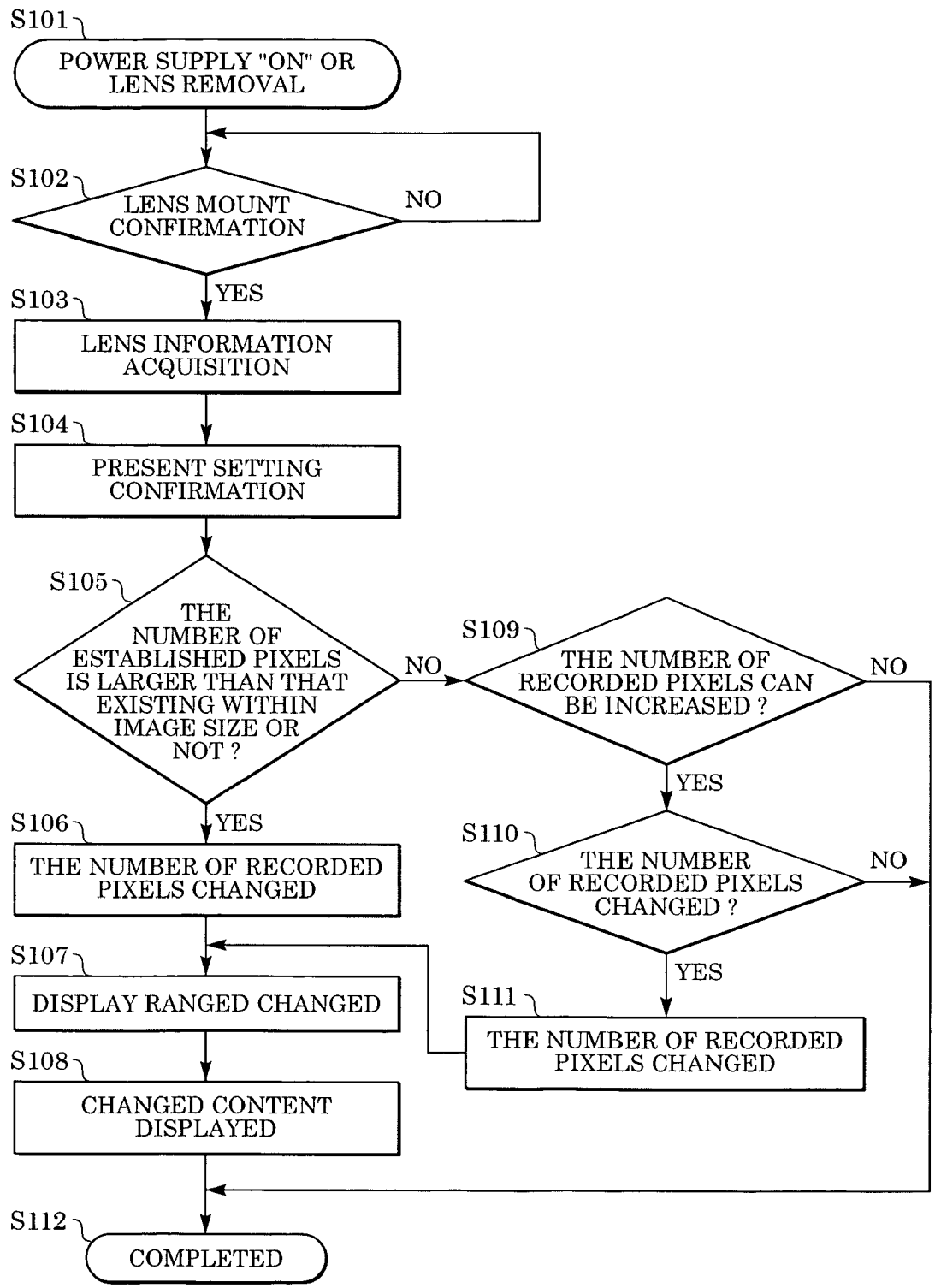
FIG. 2 illustrates a flowchart of the camera system according to at least one exemplary embodiment.
Figure 3:
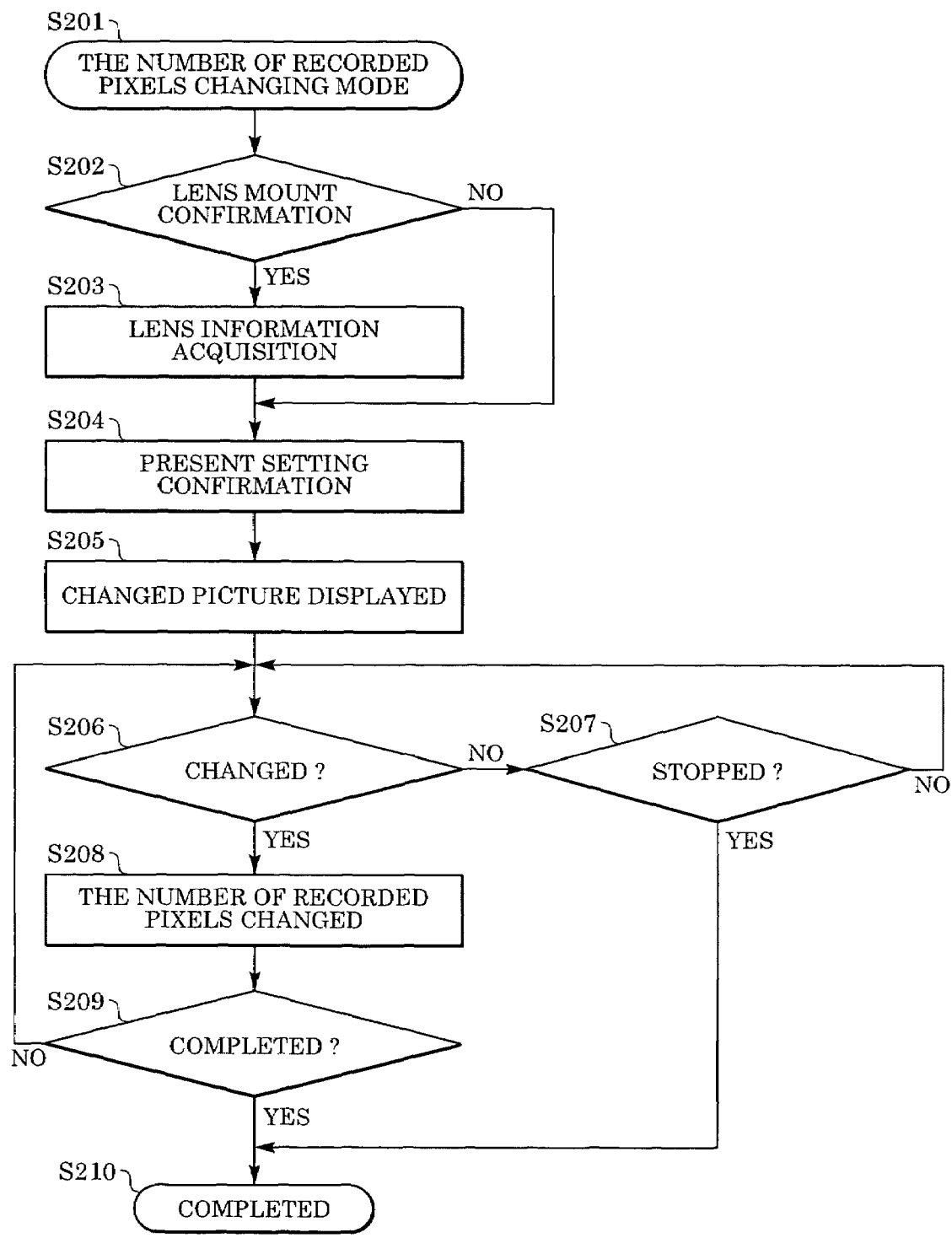
FIG. 3 illustrates a flowchart of the camera system according to at least one exemplary embodiment.

Then, with reference to FIGS. 2 and 3, the control of the camera system according to the embodiment will be described. FIGS. 2 and 3 are flowcharts showing a control procedure of the camera system according to the embodiment.

At Step 101 (abbreviated as "S" in the drawing), the setting confirmation operation of the number of recorded pixels is started (e.g., via instructions by the camera microcomputer 15) when the lens detection circuit 22 detects that the power supply switch 23 is turned on or the lens apparatus 2 is removed by a user. At Step 102, the camera microcomputer 15 can monitor the output of the lens detection circuit 22, and when the mounting of the lens apparatus 2 is confirmed, the process proceeds to Step 103.

At Step 103, the camera microcomputer 15 can command the lens microcomputer (e.g., micro-processor) 10 to transmit the information about the image size of the imaging optical system of the lens apparatus 2. For example, the lens microcomputer 10 reads the information from the EEPROM 11 and transmits it to the camera microcomputer 15, where the information can be stored for later retrieval (e.g., stored in memory 15a).

At Step 104, the camera microcomputer 15 confirms the present setting (current setting) of the number of recorded pixels of camera 1 (e.g., the set number of recorded pixels). At Step 105, the camera microcomputer 15 reads the information of the number of imaging pixels existing within the image size of the lens apparatus 2 (e.g., the information can be stored in the memory 15a based on the information fed from the lens microcomputer 10 at Step 103). The number of imaging pixels can be compared with the number of recorded pixels set at the present, if the set number of recorded pixels is the same as the number of imaging pixels or less (i.e., "NO" on the flowchart of FIG. 2), the process proceeds to Step 109, and if otherwise (i.e., "YES" on the flowchart of FIG. 2), the process proceeds to Step 106.

For example, if the number of recorded pixels set currently (i.e., in the present) is 1536×1024, and the number of imaging pixels existing within the image size is larger than the above figure, the process proceeds to Step 106.

At Step 109, if the number of recorded pixels (e.g., 2048×1360,) capable of being set (e.g., by a user) is larger than the number of recorded pixels set at the present (e.g., 1536×1024) in the camera 1, the camera microcomputer 15 compares the number of recorded pixels capable of being set with the number of imaging pixels existing within the image size of the lens apparatus 2. If the number of recorded pixels capable of being set is less than the number of imaging pixels existing within the image size of the lens apparatus 2, the process proceeds to Step 110, and if otherwise, the process proceeds to Step 112.

At Step 110, the camera microcomputer 15 can inform a user (e.g., via a display unit 20) that the number of pixels can be changed. The user can then determine whether the setting of the number of recorded pixels is to be changed from the number of recorded pixels set at the present to the larger number of recorded pixels capable of being set.

If the user elects to change the number of recorded pixels, the process proceeds to Step 111, otherwise, the process proceeds to Step 112.

At Step 111, the camera microcomputer 15 can change the setting of the number of recorded pixels from the number of recorded pixels set at the present to the number of recorded pixels selected by the user.

At Step 106, the camera microcomputer 15 changes the setting of the number of recorded pixels from the number of recorded pixels set at the present (e.g., 1042×768) to the maximum number of recorded pixels (e.g., 1536×1024) capable of being set.

At Step 107, the camera microcomputer 15 changes the range of the imaging object (the range of the pixel output for displaying) on the display unit 20 (display) to within the range of the image capturing element corresponding to the image size of the lens apparatus 2. At Step 108, the camera microcomputer 15 informs the user of the content of the setting change (e.g., the number of recorded pixels from Step 106 or Step 111) by displaying the content on the display unit 20 for a predetermined period of time.

At Step 112, the camera microcomputer 15 terminates the setting confirmation operation, instigated by the turning on of the power supply switch 23 by the user or the removal of the lens apparatus 2.

At Step 201, when the camera microcomputer 15 detects the operation of the mode setting unit 19, the camera microcomputer 15 starts the setting change of the number of recorded pixels. At Step 202, the camera microcomputer 15 confirms whether the lens apparatus 2 is mounted based on the output signal from the lens detection circuit 22. If the lens apparatus 2 is mounted, the process proceeds to Step 203, and if otherwise, the process proceeds to Step 204.

At Step 203, the camera microcomputer 15 commands the lens microcomputer 10 to transmit the information about the image size in the imaging optical system of the lens apparatus 2 (e.g., the lens microcomputer 10 reads the data stored in the EEPROM 11 and transmits it to the camera microcomputer 15).

At Step 204, the camera microcomputer 15 confirms the present setting situation of the number of recorded pixels in the camera 1. At Step 205, the camera microcomputer 15 displays (e.g., sends to display unit 20) information on the number of recorded pixels capable of being set by a user as well as the number of imaging pixels existing within the image size of the lens apparatus 2 in the image capturing element 21 (when the mounting of the lens apparatus 2 is not confirmed at Step 202, the number of entire recorded pixels capable of being set in the camera 1 is displayed). The information can be displayed on the display unit 20 as an option to choose a particular number of changeable recorded pixels (e.g., 3072×2048, 2048×1360, 1536×1024, and 1024×768).

At Step 206, the camera microcomputer 15 determines whether the user selects the desired number of recorded pixels by operating the mode setting unit 19, and when the user selects it, the process proceeds to Step 208, and if otherwise, the process proceeds to Step 207. At Step 207, the camera microcomputer 15 determines whether the user selects to stop changing the setting of the number of recorded pixels by operating the mode setting unit 19, and when the user selects it, the process proceeds to Step 210, and if otherwise, the process proceeds to Step 206.

At Step 208, the camera microcomputer 15 changes the setting of the number of recorded pixels from the number of recorded pixels set at the present (i.e., the set number of recorded pixels) to the number of recorded pixels selected by the user at Step 206. At Step 209, the camera microcomputer 15 determines whether the user selects the completion of changing the setting of the number of recorded pixels by operating the mode setting unit 19, and when the user selects it, the process proceeds to Step 210, and if otherwise, the process proceeds to Step 206. At Step 210, the camera microcomputer 15 completes the changing operation of the setting of the number of recorded pixels (e.g. based on the operation of the mode setting unit 19 by the user detected at Step 201).

In the camera system according to the embodiment, by changing the setting of the number of recorded pixels to the compatible number of recorded pixels between the camera and the lens apparatus, an improved imaging picture can be recorded with reduced shading. In this case, by informing a user that the number of recorded pixels is changed, the user can comprehend the setting of the number of recorded pixels.

In at least one exemplary embodiment of a camera system, the user is informed that the setting of the number of recorded pixels can be changed, for example if the number of recorded pixels set at the present is smaller than the number of imaging pixels of the image capturing element 21 of the area agreeing with the image size of the imaging optical system of the lens apparatus 2.

Furthermore, in the camera system according to at least one exemplary embodiment, by performing the confirmation and changing of the number of recorded pixels when the power supply is turned on and the lens apparatus 2 is mounted as described above, the number of recorded pixels of the camera 1 can be securely set in conformity with the image size of the imaging optical system of the lens apparatus 2, so that an improved imaging picture can be recorded with reduced shading.

According to at least one exemplary embodiment, in a mode changing the setting of the number of recorded pixels, by limiting the selection of the number of recorded pixels being incompatible with the image size of the imaging optical system of the lens apparatus 2, an improved imaging picture can be recorded with reduced shading.

Furthermore, according to the embodiment, on the display unit 20 capable of observing an imaging object, only the range corresponding to the number of recorded pixels compatible with the image size of the imaging optical system of the lens apparatus 2 in the image capturing element 21 is displayed. In this case, instead of the display unit 20, even when an optical finder (observing device) is used, by mechanically masking an optical display range incompatible with the image size of the imaging optical system of the lens apparatus 2, an improvement can be obtained.

While the present invention has been described with reference to exemplary embodiments, it is to be understood that the invention is not limited to the disclosed exemplary embodiments. On the contrary, the invention is intended to cover various modifications and equivalent arrangements included within the spirit and scope of the appended claims, specification, figures, and as known by one of ordinary relevant skill in the art. The scope of the following claims is to be accorded the broadest interpretation so as to encompass all such modifications and equivalent structures and functions.

This application claims priority from Japanese Patent Application No. 2004-174032 filed Jun. 11, 2004, which is hereby incorporated herein in its entirety.

What is claimed is:

1. A camera utilized in a camera system which includes at least one lens apparatus having a different image size than the camera, the camera adapted to have one of the at least one lens apparatuses mounted thereon the camera, the camera comprising:
an image capturing element;
a memory configured to record images obtained from the image capturing element;
a controller configured to change a number of recorded pixels of the images stored in the memory based on information about the image size of the lens apparatus acquired from the lens apparatus mounted on the camera; and
a display controlled by the controller,
wherein the memory stores a plurality of number of recorded pixels for the image size of the lens apparatus mounted on the camera,
wherein a selectable number of recorded pixels are equal to or less than a maximum number of recorded pixels existing within the image size of the lens apparatus among the plurality of number of recorded pixels stored in the memory, and
wherein the display displays at least one of the selectable number of recorded pixels that exceeds the number of recorded pixels set at present when the at least one of the selectable of recorded pixels for the image sizes of the lens apparatus mounted on the camera exceeds the number of recorded pixels set at present.

2. The camera according to claim 1, wherein the controller determines whether the number of recorded pixels set at the present corresponds to the number of image pixels of the at least one lens apparatus mounted on the camera, and if it does not correspond, the controller changes the number of recorded pixels to the a number of recorded pixels that equal the number of image pixels corresponding to the at least one lens apparatus, where the number of image pixels is based on the information about the image size of the at least one lens apparatus.

3. The camera according to claim 1,
wherein the controller is configured to display at least one of a message that the number of recorded pixels can be changed, the number of recorded pixels, and the number of selected pixels.

4. The camera according to claim 1,
wherein the controller is configured to detect the number of recorded pixels to be recorded in the memory and determine whether the lens apparatus mounted on the camera is compatible based on information about the image size of the at least one lens apparatus mounted on the camera so as to limit the selection of the number of recorded pixels to numbers compatible with the at least one lens apparatus.

5. A camera system including at least one lens apparatus having a different image size than the camera, the camera adapted to have one of the at least one lens apparatuses mounted thereon the camera, the camera system comprising:
an image capturing element;
a memory configured to record images obtained from the image capturing element;
a controller configured to change a number of recorded pixels of the images to be recorded in the memory based on information about the image size of the at least one lens apparatus mounted on the camera; and
a display controlled by the controller,
wherein the memory stores a plurality of number of recorded pixels for the image sizes of the lens apparatus mounted on the camera,
wherein a selectable number of recorded pixels are equal to or less than the maximum number of recorded pixels existing within the image size of the lens apparatus among plurality of the numbers of recorded pixels stored in the memory,
and wherein the display displays at least one of the selectable number of recorded pixels that exceeds the number of recorded pixels set at present when the at least one of the selectable numbers of recorded pixels for the image sizes of the lens apparatus mounted on the camera exceeds the number of recorded pixels set at present.

6. The system according to claim 5, wherein the controller determines whether the number of recorded pixels set at the present corresponds to the number of image pixels of the at least one lens apparatus mounted on the camera, and if it does not correspond, the controller changes the number of recorded pixels to a number of recorded pixels that equal the number of image pixels corresponding to the at least one lens apparatus, where the number of image pixels is based on the information about the image size of the at least one lens apparatus.

* * * * *